United States Patent [19]

Sepanik

[11] Patent Number: 4,460,219
[45] Date of Patent: Jul. 17, 1984

[54] WHEEL COVER RETAINER ASSEMBLY

[75] Inventor: Thomas E. Sepanik, Livonia, Mich.

[73] Assignee: Ford Motor Company, Dearborn, Mich.

[21] Appl. No.: 429,585

[22] Filed: Sep. 30, 1982

[51] Int. Cl.³ .............................................. B60B 7/06
[52] U.S. Cl. ........................... 301/108 R; 301/37 CM
[58] Field of Search ............... 301/9 SC, 17, 37 CM, 301/37 H, 37 TP, 108 R, 108 A

[56] References Cited

U.S. PATENT DOCUMENTS

| | | | |
|---|---|---|---|
| 418,149 | 12/1889 | Anderson, Jr. | 301/108 R |
| 437,748 | 10/1890 | Bowe | 301/108 R |
| 451,337 | 4/1891 | Shilling, Jr. | 301/108 R |
| 1,066,613 | 7/1913 | Higgin | 301/108 R |
| 1,568,768 | 1/1926 | Reid | 301/108 R X |
| 1,945,410 | 1/1934 | Antoni | |
| 1,960,469 | 5/1934 | White | 301/108 R |

*Primary Examiner*—David A. Scherber
*Attorney, Agent, or Firm*—Daniel M. Stock; Clifford L. Sadler

[57] ABSTRACT

A retainer assembly for an automotive wheel member ornamental cover includes a cam surface arranged about the periphery of an aperture in the wheel member and a resilient retainer assembly having fingers insertable through slots piercing the cam surface to be flexed through rotation of the cover to a position registering with locking notches formed in the cam surface wherein snap fit retention is effected.

4 Claims, 3 Drawing Figures

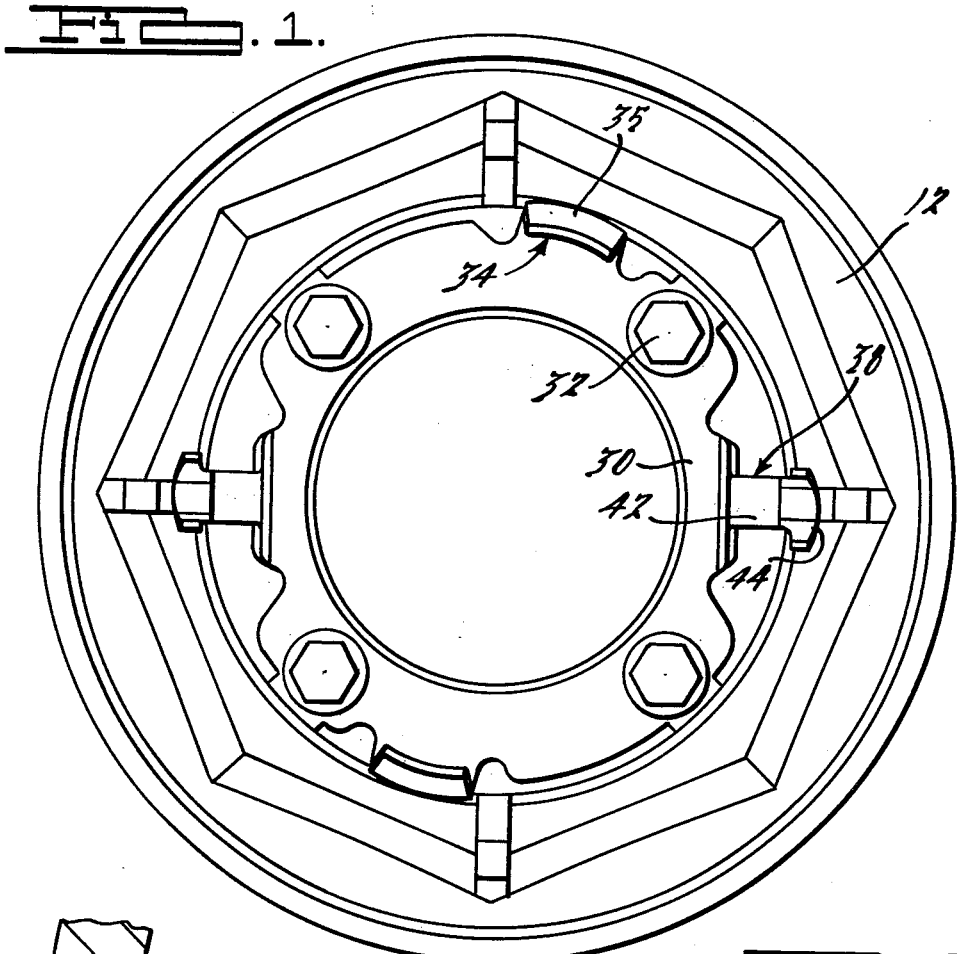
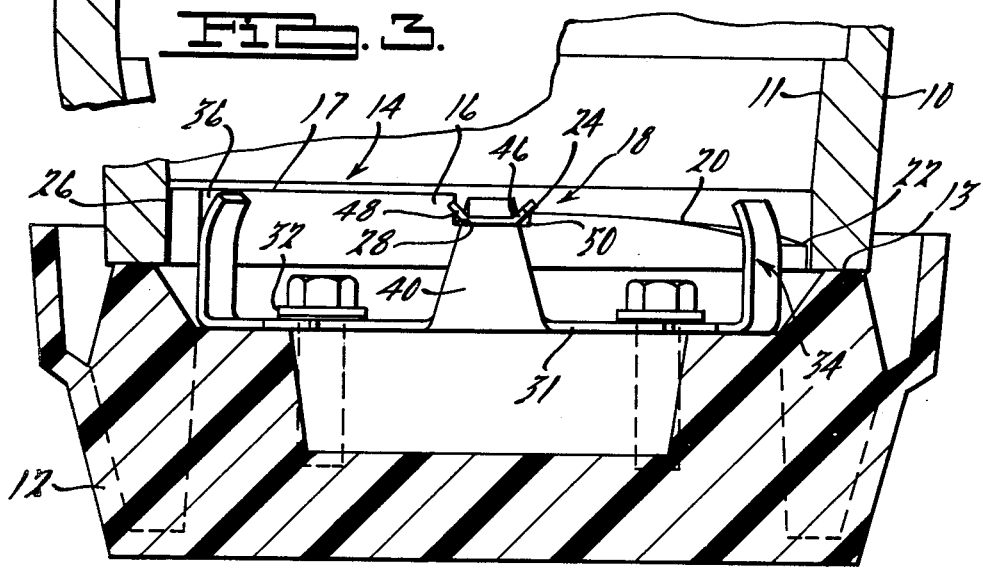

WHEEL COVER RETAINER ASSEMBLY

BACKGROUND OF THE INVENTION

1. Field of the Invention

The present invention relates generally to motor vehicle wheels and more particularly to retention mechanisms for ornamental covers used with such wheels.

2. Description of the Prior Art

In the fabrication of motor vehicle wheels and wheel covers in which a raised central hub portion of the wheel or wheel cover includes an aperture closed by an ornamental cover member, various conventional retaining means have been employed to effect the securing of the ornamental cover to the hub portion. Exemplary of such retaining means are the bayonet connections of U.S. Pat. No. 1,945,410 to Antoni and the spring clips of U.S. Pat. No. 1,960,469 to White. While such retaining means have been generally effective, they have likewise on occasion exhibited certain undesirable characteristics. Among these have been tendencies to rattle or become disengaged during use. Providing auxiliary fastening means to combat this tendency has been found to be uneconomical.

SUMMARY OF THE INVENTION

Responsive to the deficiencies in the prior art the present invention provides a retainer assembly that simply and economically effects retention of an ornamental cover to a hollow hub portion of a motor vehicle wheel or wheel cover.

The invention retainer assembly includes axially rising cam surfaces formed on an annular wall about the periphery of the hub aperture in which axially inwardly facing notches are formed to receive spring fingers carried on the ornamental cover. Axial through slots pierce the wall at locations circumferentially spaced from the notches and the spring fingers are flexed against the cam surfaces after insertion through the slots upon rotation of the cover to a position wherein the fingers are received in snap fit.

BRIEF DESCRIPTION OF THE DRAWINGS

FIG. 1 is a bottom elevational view of the cover member of the retainer assembly of the present invention;

FIG. 2 is a cross-sectional view of the retainer assembly of the present invention, and FIG. 3 is a fragmentary view showing an entry slot formed through the hub portion annular wall of the present invention.

DESCRIPTION OF THE PREFERRED EMBODIMENT

Turning now to the drawing and in particular to FIG. 2 thereof, a wheel hub portion of a vehicle wheel member which may be a wheel or a wheel cover is illustrated as including a central bore 11 which is closed by an ornamental cover 12. The retainer assembly 14 of the present invention is operatively connected between the hub portion 10 and the ornamental cover 12 to secure these elements together in an abutting relationship as indicated at 13 to close the bore 11.

The retainer assembly 14 is illustrated in FIGS. 1 and 2 as consisting essentially of an annular wall 16 carried with the hub portion 10 and a resilient locking assembly 18 carried with the cover member 12. It will be clear to those skilled in the art that while the wall 16 is here described as being integrally formed with the hub portion 10 and the resilient lock assembly 18 is illustrated as being detachably secured to the cover 12, certain modifications of these choices in construction may be made without departing from the scope of the present invention.

In the illustrated embodiment, the wall 16 is configured to define a cam surface 20 along a portion of its circumference arranged peripherally within the bore 11 and providing a ramp extending from an axially outer position indicated at 22 to an axially inner position indicated at 24. The remainder of the wall 16 is preferably straight as indicated at 17. It is to be understood that in the embodiment shown pairs of cam surfaces 20 and straight portions 17 are arranged at diametrically opposed locations about the bore 11.

Axially extending entry slots 26 as may best be seen in FIG. 3, are formed in circumferential registration with the outer positions 22 and locking notches 28 are formed in circumferential registration with the inner positions 24.

The resilient locking assembly 18 is illustrated as consisting essentially of a plate member 30 formed as by stamping or the like from a flexible material and secured to the ornamental cover 12 as by fasteners 32. A pair of upstruck guide tabs 34 extend from the base 31 of the plate member 30 and include a curved outer surface 35 for guidingly engaging an inner diameter 36 of the wall 16. The plate member 30 is illustrated as further including a pair of spring fingers 38 which each include an upright portion 40 struck upwardly as viewed in FIG. 2 from the base 31 of the plate member 30 and a radially outwardly extending arm portion 42 which extends from the upright portion 40 to a locking portion 44. The locking portion 44 includes an abutment edge 46 on one side and an upturned leading edge 48 on the other side.

The retainer assembly of the present invention is operative to securely fix the cover 12 to the hub portion 10 in the following manner. The cover 12 is arranged circumferentially with respect to hub portion 10 such that the spring fingers 38 of the resilient lock assembly 18 are in registration with the entry slots 26. The cover 12 is then engaged in abutting relationship with the hub portion 10 as indicated at 13 in FIG. 2. Upon rotating the cover 12 with respect to the hub portion 10 in the clockwise direction, the upturned lead portion 48 of the locking portion 44 ramps up on the cam surface 20 and the spring fingers 38 are deflected axially inwardly until the spring fingers 38 are in circumferential registration with the locking notches 28, whereupon the locking portions 44 of the spring fingers 38 are received in the locking notches 28 in snap fit relationship. Further clockwise rotation of the cover member 12 is prevented by engagement of the abutment edges 46 of locking portions 44 with complimentary notch locking surfaces 50 of locking notches 28, straight portion 17 of annular wall 16 being configured to define the locking surfaces 50 extending axially inwardly beyond inner position 24 of cam surface 20.

Selective removal of the cover member 12 from the hub portion 10 is facilitated by the provision of the upturned leading edge 48 of locking portion 44 permitting counterclockwise rotation of the cover member 12. However, the abuttingly engaging force imposed between the hub portion 10 and the cover 12 by spring fingers 38 resists inadvertent removal of the spring fingers 38 from the locking notches 28.

While only one embodiment of the present invention has been disclosed, others may be possible without departing from the scope of the following claims.

what is claimed is:

1. In a motor vehicle wheel member having a hollow annular hub portion having a central aperture and a cover member engageable with the hub portion to close the aperture, a retainer assembly for securing said cover member to said hub portion, the retainer assembly comprising:
   A. means defining a radially inwardly extending wall proximate the outer end of said hub portion;
   B. means defining at least a pair of cam surfaces on the axially inner face of said wall, said cam surfaces being arranged on diametrically opposite sides of said aperture and each defining a ramp extending axially inwardly between an axially outer entry position and an axially inner locking position spaced circumferentially therefrom;
   C. an axially extending entry slot formed through said wall at each entry position;
   D. a locking notch formed in said wall inner face at each locking position; and
   E. resiliently locking means fixedly carried with the cover member and having an annular plate portion for engagement with a complementary portion of said cover member, at least a pair of circumferentially spaced guide tab portions extending axially from said plate portion and guidingly circumferentially engaging a radially inner axially extending surface of said hub portion wall, and a locking portion having at least a pair of radially extending locking fingers supported in cantilever fashion from said plate portion at diametrically opposed positions and including resilient locking portions insertable through said entry slots and axially displaceable upon engagement with said ramps during rotation of said cover member in one direction to engage said notches in snap-fit relationship.

2. A retainer assembly as defined in claim 1 and further comprising means for preventing further rotation of said cover member in said one direction when said fingers engage said notches.

3. A retainer assembly as defined in claim 1 wherein said fingers include a resilient arm portion and a locking portion formed proximate the free end thereof receivable in snap fit relationship within said notches, said locking portion having a stop surface for abuttingly engaging a complementary surface of said notch to prevent rotation of said cover member in said one direction when said fingers engage said notches.

4. A retainer assembly as defined in claim 3 wherein said fingers further include an up-turned surface circumferentially opposed to said stop surface to facilitate rotation of said cover member in the opposite direction.

* * * * *